Patented July 21, 1925.

1,546,679

UNITED STATES PATENT OFFICE.

VIRGIL B. SEASE, OF NEWARK, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING CELLULOSE ACETATE.

No Drawing.    Application filed May 14, 1919.    Serial No. 297,168.

*To all whom it may concern:*

Be it known that I, VIRGIL B. SEASE, a citizen of the United States, and a resident of Newark, in the county of Essex and State of New Jersey, have invented a certain new and useful Process of Producing Cellulose Acetate, of which the following is a specification.

This invention relates to a process of producing granular cellulose acetate, and pertains particularly to a process in which cellulose is subjected to a preliminary treatment to place it in a condition favorable to acetylation.

If bone dry cellulose without preliminary treatment is introduced into an acetylating bath of acetic acid, acetic anhydride and sulfuric acid, a superficial acetylation takes place upon the fibre and a protective coating is formed, which seriously interferes with complete acetylation of the fibre. In order to overcome this difficulty it has heretofore been proposed to impregnate the cellulose fibre with a conditioning agent such as a mixture of sulfuric acid and acetic acid, the conditioning agent ordinarily comprising the acetylating catalyst as one constituent.

In an investigation of cellulose-acetylation reactions, I have found that in direct acetylation without a preliminary treatment of the cellulose, the sulfuric acid which is used as a catalyst appears to diffuse readily through the coating of cellulose acetate which is initially formed, and to act on the remainder of the fibre to harden it or by some other chemical change to make it unresponsive to the acetylating agent. This indicated the necessity of first treating the fibre in such a way that it is not altered chemically but is put into a physical state to easily overcome the mechanical difficulties of transference of the reacting substances in the heterogeneous reaction which takes place.

The preliminary treatment employed in prior processes, where the cellulose is to be converted into cellulose acetate in solution in the acetylating bath, has invariably resulted in chemically changing the cellulose so that the substance which is in fact acetylated is a hydrocellulose of various degrees of hydration. Experiments which I have carried out show that sulfuric acid when used in the preliminary treatment brings about a marked degradation of the cellulose molecule, and that the acetylation which follows tends to produce degraded and inferior products, particularly in that their solutions exhibit low viscosity and cast brittle films.

I have discovered that acetylation of cellulose may be effected to great advantage by incorporating in cellulose, prior to the main acetylating step, a substantial proportion of the acetic acid and the acetic anhydride which is required for complete acetylation, and I have found it to be especially desirable to work with cellulose which contains a small percentage (for example, 1 to 4%) of moisture, or, where a bone dry cellulose is more readily obtainable, to use acetic acid containing a small percentage of water. The water accelerates the acetylating reaction very materially. The thus treated cellulose is then introduced into a bath containing sulfuric acid and such amounts of acetic acid and acetic anhydride as are necessary in addition to what is carried by the cellulose to effect the desired acetylation. By vigorously stirring the mass while maintaining it at room temperature (20 to 30° C.) a clear, very viscous solution without traces of fibres is obtained in 3 to 5 hours.

The advantages obtained by my process are due to the fact that all the reacting substances with the exception of the catalyst are distributed through the channels of the fibre. When the fibre is brought into contact with the catalyst, the reaction proceeds with the greatest possible uniformity and speed, as only contact with a trace of sulfuric acid is necessary to cause it to react. The acetylating agent is in intimate contact with the cellulose and does not have to diffuse through superficial coatings of cellulose acetate that would otherwise tend to form on the fibre. The sulfuric acid which must penetrate the superficial coatings appears to do so without difficulty. By proceeding in this manner there can be produced exceedingly viscous solutions without traces of unreacted fibres after acetylating three to five hours. Other processes, particularly those without preliminary treatment, often show incomplete acetylation at the end of twelve to eighteen hours.

In order to secure the beneficial action of the small percentage of water which is used it is necessary to start the acetylating reaction before the water combines with acetic anhydride to form acetic acid. This is easily accomplished, however, for the reason that the reaction between acetic anhydride and water is slow, hardly appreciable reaction occurring at ordinary temperature within a period of one hour after the two are mixed together.

My process may be illustrated by the following specific examples:

1. Preliminary treatment.

(a) High grade tissue paper (such as is commonly used in the manufacture of pyroxylin plastics) containing 2 or 3% of moisture, is immersed in a mixture of about equal parts of acetic anhydride and acetic acid of 98 to 100% of strength. The cellulose is then pressed out so much of the mixture as is present in excess of the amount which it is desired to have the cellulose retain. The amount of acetic anhydride which the cellulose is allowed to retain may be either the entire amount which is needed for acetylation, or only a part thereof; thus the amount of acetic anhydride and acetic acid left in 100 parts of cellulose may with advantage range from 60 parts (20 of anhydride and 40 of acid, or 30 of anhydride and 30 of acid) to 500 parts (250 of anhydride and 250 of acid). The proportions which I prefer are about 100 parts acetic acid and about 100 parts of acetic anhydride to 100 parts of cellulose.

(b) Instead of immersing the cellulose in the mixture of acetic acid and acetic anhydride I may pass a mixture of the vapors of 98 to 100% acetic acid and acetic anhydride into the cellulose until the latter has absorbed the desired amount of such vapors, the treatment being carried out either at normal atmospheric pressure or in a partial vacuum. This treatment (b) has certain advantages over (a) namely, that impregnation with vapors dispenses with the operation of pressing out any excess of the preliminary bath, requires less handling of the paper, and the paper at the same time can be kept in a loose shredded condition. In this condition, it shows less tendency to form into lumps when stirred into the acetylating bath, thus coming more readily into contact with the catalyst and the acetylating agent. Diminished pressure facilitates the impregnation in that the air in the channels of the fibre is more readily replaced with acetic acid. Also, the concentration of acetic acid in the vapor phase is increased.

2. Acetylation.

The treated paper is introduced into a bath, the contents of which depend upon what ingredients have been put into the fibre of the paper in the preliminary treatment. The complete bath including the reagents used in the preliminary treatment should contain approximately:—

100 parts paper, 1–5 parts water, 600 parts acetic acid (glacial), 250 parts acetic anhydride, 10 parts sulphuric acid, but considerable variation of these quantities may be made and still yield essentially the same end products. Of the 250 parts of anhydride used only about 95 parts combine with the cellulose to form acetyl-cellulose, about 160 parts of undegraded acetyl cellulose being produced. The excess of anhydride needed in this process is, however, much less than that ordinarily required in the processes of the prior art.

The mass is vigorously stirred and cooled to room temperature or lower. At 25 to 30° C. a clear very viscous solution without traces of fibres is obtained in 3 or 4 hours. At this stage a variety of cellulose acetate may be isolated by precipitating and washing with water, which is insoluble in acetone, chloroform, tetrachlorethane, or nitrobenzene, but soluble in the last three solvents mentioned if they contain appreciable amounts of alcohol. It is best not to isolate the cellulose acetate at this stage, both on account of its commercially undesirable solubilities and on account of the difficulty of washing and purifying the product which at this stage contains a lot of more or less unstable esters of sulfuric acid. The viscous mass is next treated as follows:—

3. Alteration of solubility.

To the primary acetylating bath is added a mixture of:

100 parts water, 200 parts acetic acid, 10 parts sulfuric acid. After thorough mixing, the temperature is raised to between 40 and 65° C., and preferably to about 60° C. The product which was insoluble in chloroform at the outset quickly becomes soluble in the same. At the end of about one hour the product is soluble in pure acetone or methyl acetate. Soon thereafter solubility in hot benzol-alcohol and in commercial ethyl acetate develops. At the end of about 3 hours the product is also soluble in hot 75% alcohol. All these solubilities then exist simultaneously with the exception of the chloroform solubility. While these solubilities are developing, the product is found to become first gelatinous, and finally insoluble, in chloroform.

Quite wide variations in the amount of water mentioned above can be made (for instance, from 50 to 130% based on the cellulose) without changing the described development of solubilities. Considerable variation can be made also in the amount of sulfuric acid added with no other effect than changing the time required to develop the mentioned solubilities.

4. Precipitation.

When the desired solubility has been obtained the cellulose acetate may be precipitated by mixing the solution with water in the ordinary way. I prefer, however, to carry out the precipitation in the manner described in the joint application of J. M. Kessler and myself, Serial No. 297,167, filed concurrently herewith, for a process of precipitating cellulose acetate from impure solutions thereof. The procedure in this latter case is as follows: the syrupy solution is forced by means of compressed air first through a filter screen and then through small orifices into water whereby the cellulose acetate is precipitated in fine threads which can be readily washed and purified. The concentration of the precipitating bath is controlled by leading in fresh water or by continuous neutralization of the acid with alkali.

If during acetylation (step No. 2) the temperature is maintained substantially above 40° C. a product may be isolated which is soluble in chloroform alone; whereas when the temperature is maintained substantially below 40° C., say room temperature, a product insoluble in chloroform but soluble in chloroform-alcohol mixture is obtained.

With respect to step 3 above, I have found that temperatures above room temperature, say 50° C., are most desirable for altering solubility. Not only is there a great time saving effected by elevating the temperature, but the unstable cellulose esters, such as cellulose sulfoacetate, etc., present in the cellulose acetate are decomposed and the purified products cast tougher films than those treated at room temperature.

I claim:—

1. The process of making cellulose acetate which comprises first incorporating in cellulose fibre acetic acid, acetic anhydride and a small per cent of water based on the weight of the cellulose, at least substantial parts of the total amounts of acetic acid and acetic anhydride required for complete acetylation being thus incorporated, then subjecting the impregnated cellulose to the action of a bath containing an acetylating catalyst and any acetic acid and acetic anhydride necessary, in addition to that present in the cellulose, to produce the desired acetylation, adding water and a mineral acid to the resulting cellulose acetate solution, maintaining the temperature of the mixture at from about 40 to 65° C. until a desired solubility of the cellulose acetate has developed, and then precipitating and washing the resulting cellulose acetate.

2. The process of making cellulose acetate which comprises first incorporating in 100 parts of cellulose fibre from about 60 parts to about 500 parts of a mixture of about equal amounts of acetic acid and acetic anhydride, at least one of the above-mentioned substances containing such an amount of water that the water content of the impregnated cellulose will be from about 1 to 5 parts, subjecting the impregnated cellulose to the action of a bath containing sulphuric acid and any acetic acid and acetic anhydride necessary, in addition to that present in the cellulose, to produce the desired acetylation, adding water and sulfuric acid to the resulting cellulose acetate solution, maintaining the temperature of the mixture at about 60° C. until a desired solubility has developed, and then precipitating and washing the resulting cellulose acetate.

3. The process of making cellulose acetate which comprises causing 100 parts of cellulose containing from 1 to 3 parts of moisture to absorb from about 30 to 250 parts of acetic acid and from about 30 to 250 parts of acetic anhydride subjecting the impregnated cellulose to the action of a bath containing sulfuric acid and any acetic acid and acetic anhydride necessary, in addition to that present in the cellulose, to produce the desired acetylation, adding water and sulfuric acid to the resulting cellulose acetate solution, maintaining the temperature of the mixture at about 60° C. until a desired solubility has developed, and then precipitating and washing the resulting cellulose acetate.

4. The process of making cellulose acetate which comprises subjecting cellulose, previously impregnated with a mixture comprising acetic acid and acetic anhydride, but free from condensing agents which convert cellulose into hydrocellulose, to the action of an acetic acid solution containing an acetylating catalyst until the cellulose has become acetylated.

5. The process of making cellulose acetate which comprises subjecting the cellulose, previously impregnated with a mixture comprising acetic acid and acetic anhydride, but free from condensing agents which convert cellulose into hydrocellulose, to the action of an acetic acid solution containing an acetylating catalyst while maintaining the temperature between about 20 and about 40° C. until the cellulose has become acetylated.

6. The process of making cellulose acetate which comprises subjecting 100 parts of cellulose initially containing from 1 to 5 parts of water, from about 30 to 250 parts of acetic acid, and from about 30 to 250 parts of acetic anhydride, to the action of sulfuric acid and any further acetic acid and acetic anhydride necessary to effect the desired acetylation.

7. The process of making cellulose acetate which comprises subjecting 100 parts of cellulose initially containing from 1 to 5 parts of water, from about 30 to 250 parts of acetic acid, and from about 30 to 250 parts of acetic anhydride, to the action of sulfuric acid and any further acetic acid and acetic anhydride necessary to effect the desired acetylation, while maintaining the reacting mixture at a temperature below 40° C.

8. The process of making cellulose acetate which comprises subjecting 100 parts of cellulose initially containing from 1 to 5 parts of water, about 100 parts of acetic acid and about 100 parts of acetic anhydride, to the action of a solution containing about 10 parts of sulfuric acid, about 500 parts of acetic acid and about 150 parts of acetic anhydride, while maintaining the solution at a temperature below 40° C.

9. In the process of producing cellulose acetate, the preliminary step which comprises impregnating cellulose fibres, in the absence of a condensing agent capable of converting cellulose into hydrocellulose, with a substantial part of the acetic acid and acetic anhydride needed for complete acetylation.

10. In the process of producing cellulose acetate, the preliminary step which comprises impregnating 100 parts of cellulose, containing from 1 to 3 parts of water, with from about 30 to 250 parts of acetic acid, and from about 30 to 250 parts of acetic anhydride.

11. In the process of producing cellulose acetate, the preliminary step which comprises bringing the vapors of acetic acid and acetic anhydride into contact with 100 parts of cellulose until the latter has absorbed from about 30 to 250 parts of acetic acid and from about 30 to 250 parts of acetic anhydride.

12. In the process of producing cellulose acetate, the preliminary step which comprises bringing the vapors of acetic acid and acetic anhydride into contact with 100 parts of cellulose containing from 1 to 5 parts of water, until the cellulose has absorbed from about 30 to 250 parts of acetic acid and from about 30 to 250 parts of acetic anhydride.

13. The process of producing cellulose acetate which comprises subjecting cellulose initially containing acetic acid and acetic anhydride uniformly distributed therethrough but not sulphuric acid, to the action of an acetylating solution maintained at a temperature below 40° C. and containing sulfuric acid as the acetylating catalyst.

14. The process of producing cellulose acetate which comprises subjecting cellulose initially containing acetic acid and acetic anhydride uniformly distributed therethrough, to the action of an acetylating solution maintained at a temperature below 40° C. and containing sulfuric acid as the acetylating catalyst until a clear viscous solution is obtained, adding water and sulfuric acid to the solution, and maintaining the resulting solution at a temperature above 40° C. until a desired solubility of the cellulose acetate has developed.

15. In the process of producing cellulose acetate the steps which comprise adding to a solution of about 160 parts of practically unhydrolyzed cellulose acetate in 800 parts of glacial acetic acid, from about 50 to 130 parts of water, about 200 parts of acetic acid and about 10 parts of sulfuric acid, and maintaining the resulting solution at a temperature between 40° C. and 65° C. until the cellulose acetate becomes soluble in a hot benzene-alcohol mixture, in hot aqueous alcohol, in an acetone-alcohol mixture, and in an ethyl acetate-alcohol mixture.

16. The process of producing cellulose acetate soluble in ethyl acetate-alcohol mixture and in hot aqueous alcohol, which comprises maintaining a solution of 160 parts of practically unhydrolyzed and undegraded cellulose acetate in 1000 parts of acetic acid mixed with about 100 parts of water and with less than 30 parts of sulfuric acid, at a temperature of about 60° C. until the cellulose acetate becomes soluble in hot benzene-alcohol mixture and in hot aqueous alcohol.

17. As a new product, a cellulose acetate, obtainable by treating cellulose with acetic acid and acetic anhydride in the presence of sulphuric acid at a temperature below 30° C., characterized by being insoluble in both chloroform and acetone.

In testimony whereof I affix my signature.

VIRGIL B. SEASE.